Patented Oct. 10, 1950

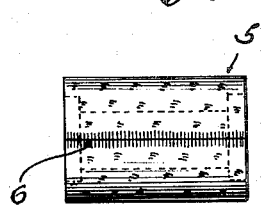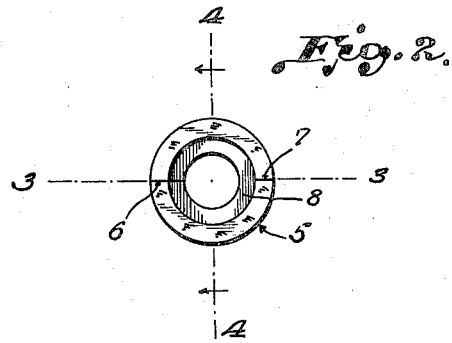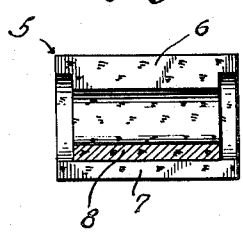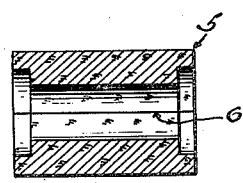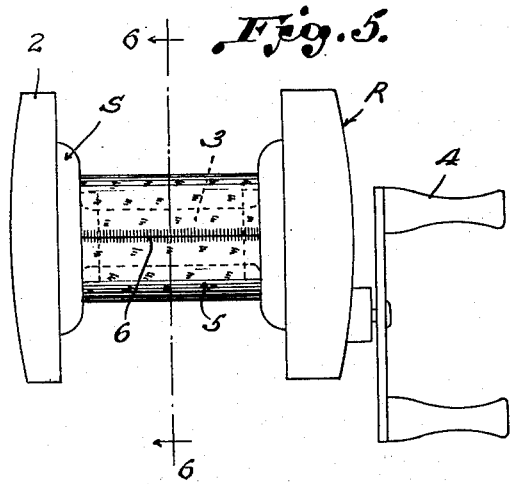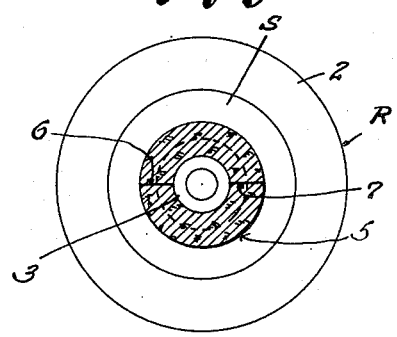
INVENTOR.
Arthur B Dodge
BY Percy H. Moore
ATTORNEY.

2,525,169

UNITED STATES PATENT OFFICE 2,525,169

CORK HUB

Arthur B. Dodge, Lancaster, Pa.

Application September 29, 1948, Serial No. 51,694

2 Claims. (Cl. 242—118)

This invention relates to cork hubs for use on fishing reels and to method of making the same.

It is a well known and established fact that in order to place these hubs on the shaft of the reel spool they must be split longitudinally and, in order to keep the two pieces together during shipment so that mated parts would not become mixed with unmated parts, it has been necessary for the manufacturer to hold them together with an encircling rubber band. This method has proven to be time consuming and expensive to the manufacturer and unsatisfactory to the user.

One of the purposes of the present invention is to provide means, integral with the hub, for maintaining the parts or halves of the hub from becoming separated prematurely, without the necessity of employing the rather clumsy method of holding the split arbor together with a conventional rubber band.

Another object of the invention lies in the provision of a hub which is completely split longitudinally on one side and only partially split longitudinally at the opposite side.

Another object is to provide the hub with a stripe or marking along both longitudinal edges of one of the completely or partly cut or split areas to assure the replacement of the hub or spool on the reel shaft with their originally cut edges adjacent to each other.

Other improvements and advantages of this invention will become apparent to those skilled in the art, when the following description is read in the light of the accompanying drawings.

In the drawings:

Figure 1 is a side elevation of the cork hub;
Figure 2 is an end view of the cork hub;
Figure 3 is a section on line 3—3 of Figure 2;
Figure 4 is a section on line 4—4 of Figure 2;
Figure 5 is a side elevation of a conventional fishing reel showing the cork hub in plan view; and
Figure 6 is a section on line 6—6 of Figure 5.

Referring now to the accompanying drawing in which like characters indicate similar parts throughout, S designates the spool of a fishing reel R upon which a conventional fishing line, not shown, is wound. The spool S includes spaced end casings 1 and 2, the former preferably housing gearing, also not shown, for actuating a shaft 3, suitably connected at its opposite ends in the casings 1 and 2 for rotation by means of a handle 4.

The numeral 5 denotes a hollow cork hub which is placed on the spool of the reel in order to fill up the space, and enable the fisherman to use a shorter line. Some reels come equipped with the hubs already applied, while other manufacturers supply the hubs separately as accessory equipment, to be removed or replaced as the fisherman desires. However, to permit of these hubs being placed on the spool, they have to be split, as previously explained.

In practice the cork hubs 5 are split longitudinally all the way through at one side thereof, as at 6, and at a diametrically opposite point in the other side of the hubs the latter are only partially split, as at 7. These slits 6 and 7, which preferably extend in a straight line and parallel one to the other, are cut by suitable machinery in the plant of the hub manufacturer. As the uncut inner thickness or portion 8 of the hub 5, constitutes a temporary fragile hinge after the partial cut 7 is made, the hubs can be conveniently and safely shipped in one piece to the reel manufacturer for installation at his plant or they can be furnished as an accessory to the fisherman customer for installation when and if desired by the latter.

Of course it will be understood that the two halves of the hubs 5 must be eventually completely separated at the partial split 7 to permit of the hubs being fitted over the shafts 3. This step is effected by completing the partial slit with a knife or by manually separating the completely severed edges along the line of split or cut 6 until the uncut web of material 8, opposite the partial cut or slit 7, is fractured. As the web 8 does not cut or fracture smoothly adjacent the cut 7 it becomes desirable to provide a colored stripe, along both edges of one split, preferably the split 6, so that during installation it will be a simple matter to place the two halves with the original cut edges adjacent to each other.

Having thus described my invention, what I claim is:

1. A hub for fishing reels comprising a hollow cylindrical body, said body formed with a longitudinal slit portion entirely therethrough, said body also formed with a second longitudinal oppositely disposed slit portion extending only partly through said body, and a colored stripe along both edges of one of said slits.

2. A hub for fishing reels comprising a hollow cylindrical body formed substantially of cork, said body being completely slit longitudinally at one side thereof to provide disconnected edges, the other side of said body being formed with a longitudinally disposed slit extending inwardly only partly through the body and toward the bore thereof to partially slit the body at said other side, said second slit portion being diametrically opposed to and extending parallel with said first slit portion, and a colored stripe extending along both edges of one of said slit portions.

ARTHUR B. DODGE.

REFERENCES CITED

The following references are of record in the file of this patent:

UNITED STATES PATENTS

| Number | Name | Date |
|---|---|---|
| 1,811,266 | Foss | June 23, 1931 |